United States Patent
Leung et al.

(10) Patent No.: US 7,080,062 B1
(45) Date of Patent: Jul. 18, 2006

(54) OPTIMIZING DATABASE QUERIES USING QUERY EXECUTION PLANS DERIVED FROM AUTOMATIC SUMMARY TABLE DETERMINING COST BASED QUERIES

(75) Inventors: Ting Yu Leung, San Jose, CA (US); David E. Simmen, San Jose, CA (US); Yang Sun, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/502,820

(22) Filed: Feb. 11, 2000

Related U.S. Application Data
(60) Provisional application No. 60/134,745, filed on May 18, 1999.

(51) Int. Cl.
*G06F 17/30* (2006.01)

(52) U.S. Cl. .................. 707/2; 707/3; 707/4; 707/5
(58) Field of Classification Search ........... 707/1–10, 707/100–104.1, 200–206; 706/45–50
See application file for complete search history.

(56) References Cited

U.S. PATENT DOCUMENTS

| | | | |
|---|---|---|---|
| 5,345,585 A | 9/1994 | Iyer et al. | 707/2 |
| 5,548,755 A | 8/1996 | Leung et al. | 707/2 |
| 5,598,559 A | 1/1997 | Chaudhuri | 707/2 |
| 5,600,829 A | 2/1997 | Tsatalos et al. | 707/2 |
| 5,671,403 A | 9/1997 | Shekita et al. | 707/3 |
| 5,687,362 A | 11/1997 | Bhargava et al. | 707/2 |
| 5,694,591 A | 12/1997 | Du et al. | 707/2 |
| 5,758,335 A | 5/1998 | Gray | 707/2 |
| 5,761,657 A | 6/1998 | Hoang | 707/4 |
| 5,797,000 A | 8/1998 | Bhattacharya et al. | 707/2 |
| 5,822,747 A * | 10/1998 | Graefe et al. | 707/2 |
| 5,855,019 A | 12/1998 | Bhargava et al. | 707/9 |
| 5,899,986 A | 5/1999 | Ziauddin | 707/2 |
| 5,918,232 A * | 6/1999 | Pouschine et al. | 707/103 R |
| 6,023,695 A * | 2/2000 | Osborn et al. | 707/2 |
| 6,023,696 A * | 2/2000 | Osborn et al. | 707/3 |
| 6,026,391 A * | 2/2000 | Osborn et al. | 707/2 |
| 6,115,714 A * | 9/2000 | Gallagher et al. | 707/100 |
| 6,205,441 B1 * | 3/2001 | Al-omari et al. | 707/2 |
| 6,240,406 B1 * | 5/2001 | Tannen | 707/1 |
| 6,330,564 B1 * | 12/2001 | Hellerstein et al. | 707/101 |
| 6,370,522 B1 * | 4/2002 | Agarwal et al. | 707/2 |
| 6,374,234 B1 * | 4/2002 | Netz | 707/102 |
| 6,374,263 B1 * | 4/2002 | Bunger et al. | 707/10 |

OTHER PUBLICATIONS

IBM Research Disclosure, "Implement LDAP Search Queries with SQL", Document No. 41695, Dec. 1998, pp 1663–1665.

(Continued)

*Primary Examiner*—Srirama Channavajjala
(74) *Attorney, Agent, or Firm*—Gates & Cooper LLP

(57) ABSTRACT

A method, apparatus, and article of manufacture for optimizing database queries using automatic summary tables. Query execution plans derived from an automatic summary table can be used to generate results for the query if a comparison of the query requirements with an automatic summary table definition determines that the automatic summary table overlaps the query, and if an optimization process determines that using the summary table will lower the cost of the query. The optimization process involves enumerating a plurality of query execution plans for the query, wherein the query execution plans enumerated include those that access combinations of query and summary tables. Each such query execution plan is assigned a cost representing an estimation of its execution characteristics, and the least costly query execution plan is selected for the query.

57 Claims, 16 Drawing Sheets

OTHER PUBLICATIONS

Y. Papakonstantinou et al., "Capabilities–based Query Rewriting in Mediator Systems", Distributed and Parallel Databases, vol. 6, No. 1, pp 73–110, (1–page Abstract) Only.

C. Ozkan et al., "A Cost Model for Path Expressions in Object–oriented Queries", Journal of Database Management, vol. 7, No. 3, pp 25–33, Summer 1996, (1–page Abstract) Only.

S. Chaudhuri et al., "Optimizing Queries with Aggregate Views", Advances in Database Technology—EDBT '96. $5^{th}$ International Conference on Extending Database Technology. Proceedings, pp 167–182, Published: Berlin, Germany, 1996, (1–page Abstract) Only.

S. Chaudhuri et al., "Query Optimization in the Presence of Foreign Functions", $19^{th}$ International Conference on Very Large Data Bases. Proceedings, pp 529–542, Published: Palo Alto, California, USA, 1993, (1–page Abstract) Only.

J. Strivastava et al., "Optimizing Multi–joint Queries in Parallel Relational Databases", Proceedings of the Second International Conference on Parallel and Distributed Information Systems (Cat. No. 93TH0493–7) pp 84–92, Published: Los Alamitos, California, USA, 1993, (1–page Abstract) Only.

G. Gardarin et al., "Optimizing Object–oriented Database Queries Using Cost–controlled Rewriting", Advances in Database Technology—EDBT '92. $3^{rd}$ International Conference on Extending Database Technology Proceedings, pp. 534–539, Published: Berlin, Germany, 1992, (1–page Abstract) Only.

H. L. Yann, "Adaptive Access Path Selection for Relational Database Systems", Computer Systems Science and Engineering, vol. 7, No. 1, pp. 52–61, Jan. 1992, (1–page Abstract) Only.

S. Ganguly et al., "Query Optimization for Parallel Execution," Proc of the 1992 ACM Sigmod Conf, 1992, 10 pp.

G.M. Lohman et al., "Grammar–Like Functional Rules for Representing Query Optimization Alternatives," Proc of ACM Sigmod Conf, May 1988, 10 pp.

H. Pirahesh et al., "Extensible/Rule Based Query Rewrite Optimization in Starburst," Proc of ACM Sigmod '92 Int'l Conf on Management of Data, San Diego, 1992, 10 pp.

P.G. Selinger et al., "Access Path Selection in a Relational Database Management System," Proc of the ACM Sigmod Int'l Conf on Management of Data, Boston, Jun. 1979, 12 pp.

D. Simmen et al., "Fundamental Techniques for Order Optimization," Proc of the ACM Sigmod Int'l Conf on Management Data, Montreal, Jun. 1996, 14 pp.

* cited by examiner

QEP2

QEP3

RICH_EMPLOYEES
RICH_LOCATION=PITTSBURGH

OPTIMIZING DATABASE QUERIES USING QUERY EXECUTION PLANS DERIVED FROM AUTOMATIC SUMMARY TABLE DETERMINING COST BASED QUERIES

CROSS-REFERENCE TO RELATED APPLICATIONS

This application claims the benefit under 35 U.S.C. §119 (e) of co-pending and commonly-assigned U.S. Provisional application Serial No. 60/134,745, entitled "COST-BASED ROUTING OF AUTOMATIC SUMMARY TABLES", filed on May 18, 1999, by Ting Y. Leung, David E. Simmen, and Yang Sun, which application is incorporated by reference herein.

BACKGROUND OF THE INVENTION

1. Field of the Invention

This invention relates in general to database management systems performed by computers, and in particular, to the optimization of queries using automatic summary tables.

2. Description of Related Art

Computer systems incorporating Relational DataBase Management System (RDBMS) software using a Structured Query Language (SQL) interface are well known in the art. The SQL interface has evolved into a standard language for RDBMS software and has been adopted as such by both the American Nationals Standard Institute (ANSI) and the International Standards Organization (ISO).

For most RDBMS software, combinations of base tables and views are used to access data stored in the database. A view definition includes a query that, if processed, provides a temporary result table based on the results of the query at that point in time. Using an INSERT statement and an appropriately defined table in the database, the temporary results table can be stored in the database. To refresh this table, the user would need to perform a DELETE from the table and then perform the INSERT again.

Users can directly query against a table in this manner, provided that the users are aware how the results were derived. Generally, the RDBMS software is not aware that such a table is any different from any other table in the database. However, this table cannot be used by an optimizer within the RDBMS software to improve performance, even though the table may contain data that would drastically improve the performance of other queries.

This leads to the notion of automatic summary tables (ASTs) or materialized views as envisioned by the present invention. These tables are similar to the created table described above, except that the definition of the table is based on a "full select" (much like a view) that is materialized in the table. The columns of the table are based on the elements of the select list of the full select.

In the present invention, with properly defined automatic summary tables, the RDBMS software is now aware how the result in the summary table was derived. When an arbitrarily complex query is submitted, an optimizer in the RDBMS software can now consider using the summary tables to answer the query, which is a technique that requires:

performing matching between the query and summary table definition so as to determine if the summary table was derived in such a way that it can be used as a starting point to satisfy the query.

performing costing to determine whether the query can be answered more efficiently by using the summary tables.

However, the current state of the art is that costing is performed using simple heuristics that do not consider the myriad of factors that can influence query execution such as the access paths available for accessing an AST, the cost of compensation, table properties such as order, partitioning, and uniqueness, the database configuration, and so on.

SUMMARY OF THE INVENTION

To overcome the limitations in the prior art described above, and to overcome other limitations that will become apparent upon reading and understanding the present specification, the present invention discloses a method, apparatus, and article of manufacture for optimizing database queries using automatic summary tables. Query execution plans derived from an automatic summary table can be used to generate results for the query if a comparison of the query requirements with an automatic summary table definition determines that the automatic summary table overlaps the query, and if an optimization process determines that using the summary table will lower the cost of the query.

The optimization process involves enumerating a plurality of query execution plans for the query, wherein the query execution plans enumerated include those that access combinations of query and summary tables. Each such query execution plan is assigned a cost representing an estimation of its execution characteristics, and the least costly query execution plan is selected for the query.

It is an object of the present invention to optimize queries using automatic summary tables. More specifically, it is an object of the present invention to enable an optimization process of the RDBMS software to use automatic summary tables to respond to queries in the most efficient way possible. The techniques presented in the present invention involves exhaustively enumerating each alternative query execution plan involving combinations of tables referenced in the query and automatic summary tables, and then selecting the most efficient one using a detailed cost model.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural and functional changes may be made without departing from the scope of the present invention.

Overview

The present invention presents a method for performing cost-based routing of automatic summary tables (ASTs). In its preferred embodiment, the present invention extends the execution space of traditional cost-based optimization architectures, which use a dynamic programming search strategy that produces a provably optimal query execution plan for a practical set of queries, to provide an optimal solution to the routing of ASTs.

Hardware and Software Environment

Figure 1:
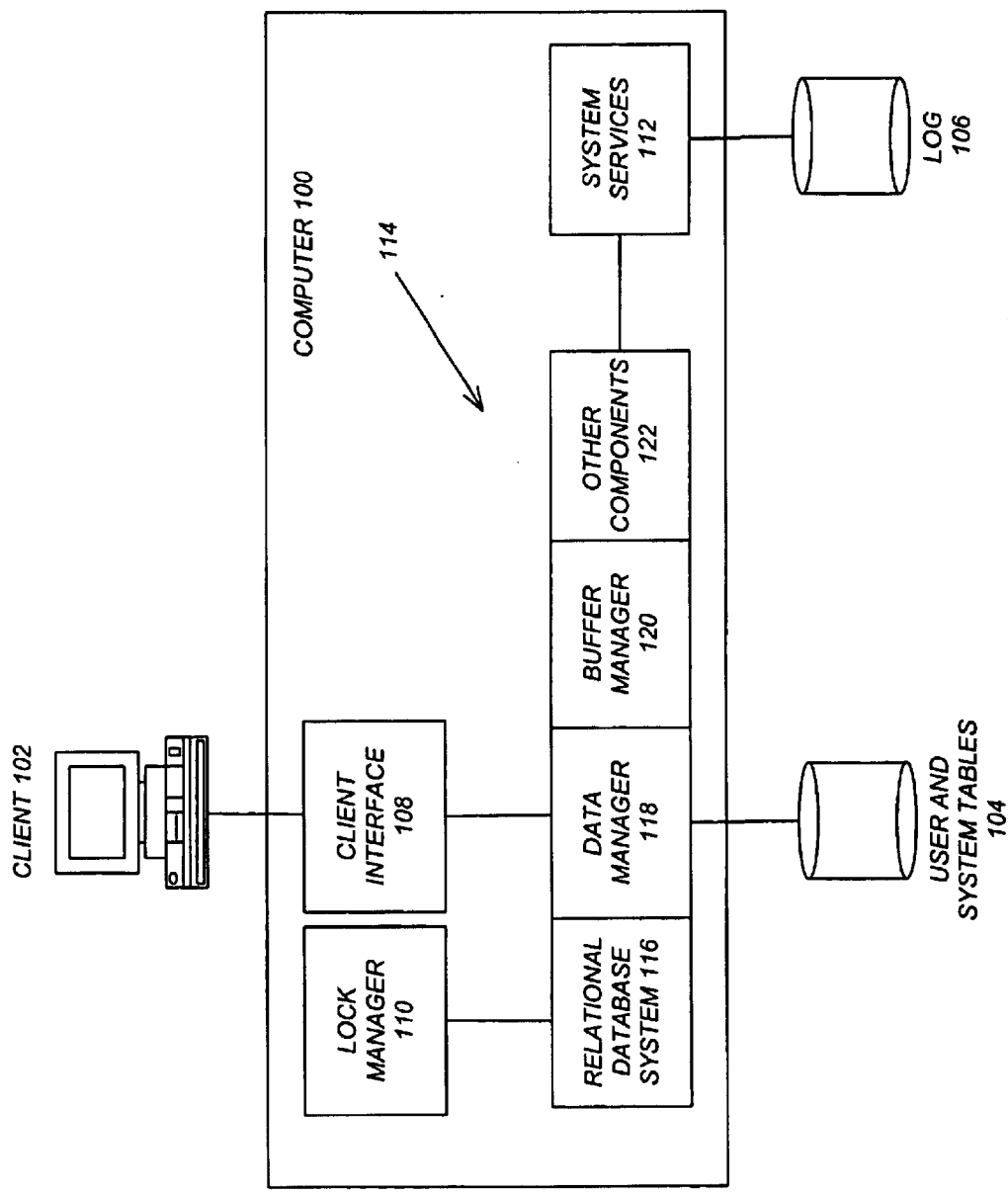
FIG. 1 illustrates an exemplary hardware and software environment that could be used with the preferred embodiment of the present invention.

FIG. 1 illustrates an exemplary hardware and software environment that could be used with the preferred embodiment of the present invention. In the exemplary environment, a server computer 100 is connected to one or more client computers 102 or terminals. The server computer 100 executes a relational database management system (RDBMS) that manages user and system tables 104 and includes a system log 106. In the preferred embodiment of the present invention, the RDBMS comprises the DataBase 2 (DB2™) Universal DataBase (UDB™) product offered by IBM Corporation, although those skilled in the art will recognize that the present invention has application to any RDBMS. The client computers 102 interface to the RDBMS via a client interface component 108.

As illustrated in FIG. 1, the RDBMS includes three major components: the Resource Lock Manager (RLM) 110, the Systems Services module 112, and the Database Services module 114. The RLM 110 handles locking services, because the RDBMS treats data as a shared resource, thereby allowing any number of users to access the same data simultaneously, and thus concurrency control is required to isolate users and to maintain data integrity. The Systems Services module 112 controls the overall RDBMS execution environment, including managing log data sets 106, gathering statistics, handling startup and shutdown, and providing management support.

At the heart of the RDBMS is the Database Services module 114. The Database Services module 114 contains several submodules, including a Relational Database System (RDS) 116, Data Manager 118, Buffer Manager 120, and Other Components 122 such as an SQL compiler/interpreter. These submodules support the functions of the SQL language, i.e., definition, access control, retrieval, and update.

Generally, the RDBMS comprises logic and/or data that is embodied in or retrievable from a device, medium, or carrier, e.g., a fixed or removable data storage device, a remote device coupled to the computer by a data communications device, etc. Moreover, this logic and/or data, when read, executed, and/or interpreted by the computer 100, causes the computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" as used herein is intended to encompass logic and/or data embodied in or accessible from any device, carrier, or media.

Of course, those skilled in the art will recognize many modifications maybe made to this configuration without departing from the scope of the present invention. For example, those skilled in the art will recognize that any combination of the above components, or any number of different components, including computer programs, peripherals, and other devices, may be used to implement the present invention, so long as similar functions are performed thereby.

Interactive SQL Execution

Figure 2:
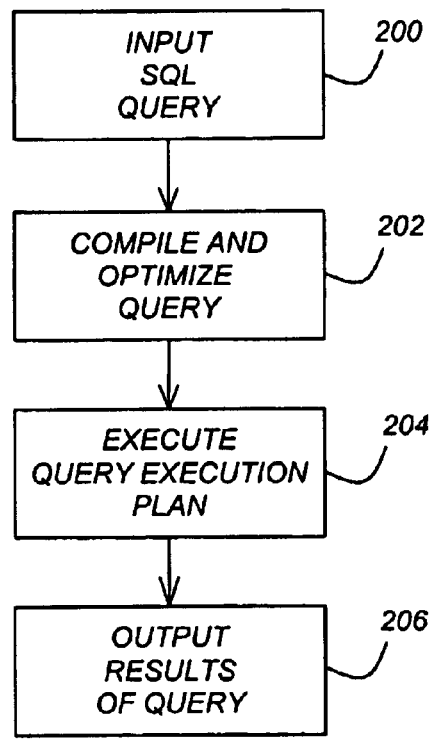
FIG. 2 is a flowchart illustrating the steps necessary for the interpretation and execution of SQL statements in an interactive environment according to the preferred embodiment of the present invention.

FIG. 2 is a flowchart illustrating the steps necessary for the compilation and execution of SQL statements in an interactive environment according to the preferred embodiment of the present invention. Block 200 represents the input of SQL statements into the computer system 102. Block 202 represents the step of compiling an SQL statement wherein the statement is optimized in manner described in more detail later in this specification. The result of this process is a set of runtime structures called a query execution plan (QEP). Block 204 represents the execution of the QEP and block 206 represents the output of the results of the QEP.

Embedded/Batch SQL Execution

Figure 3:
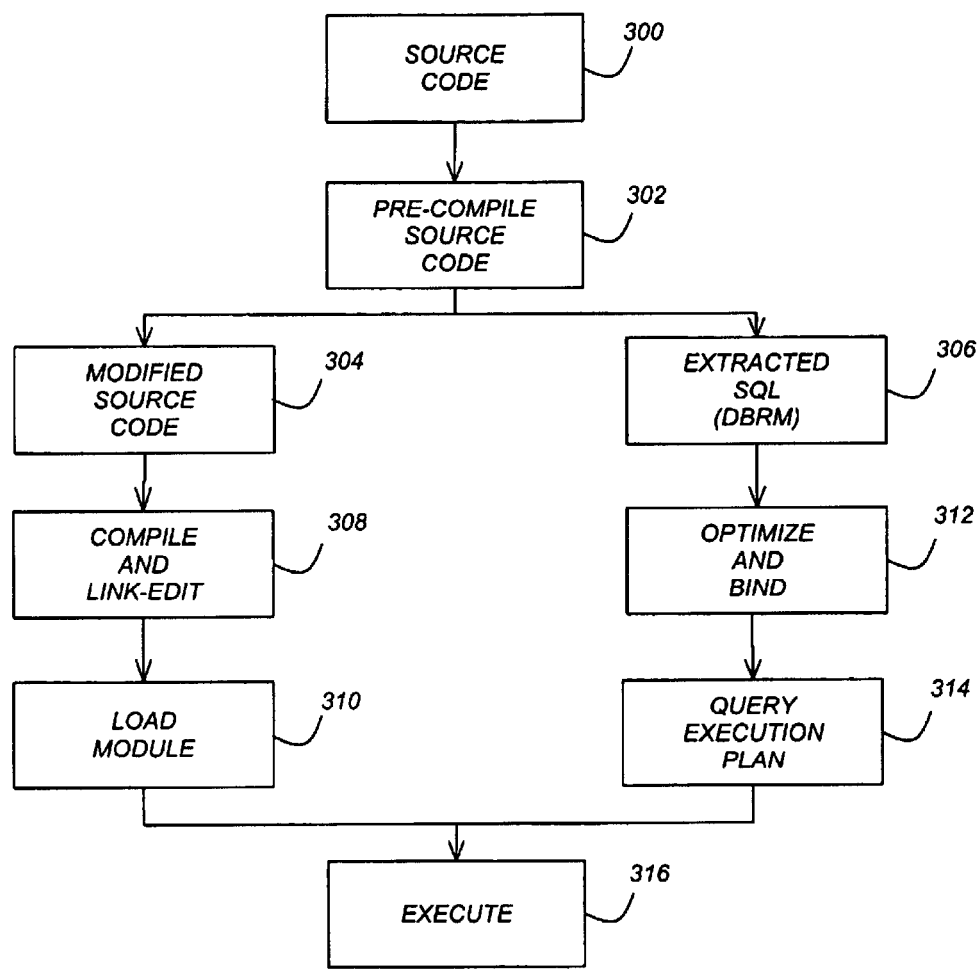
FIG. 3 is a flowchart illustrating the steps necessary for the interpretation and execution of SQL statements embedded in source code according to the preferred embodiment of the present invention.

FIG. 3 is a flowchart illustrating the steps necessary for the interpretation and execution of SQL statements embedded in source code according to the preferred embodiment of the present invention. Block 300 represents program source code containing a host language (such as COBOL or C) and embedded SQL statements. The program source code is then input to a pre-compile step 302. There are two outputs from the pre-compile step 302: a modified source module 304 and a Database Request Module (DBRM) 306. The modified source module 304 contains host language calls to the RDBMS software, which the pre-compile step 302 inserts in place of SQL statements. The DBRM 306 is comprised of the SQL statements extracted from the program source code 300. A compile and link-edit step 308 uses the modified source module 304 to produce a load module 310, while an optimize and bind step 312 uses the DBRM 306 to produce a compiled set of runtime structures for the query execution plan (QEP) 314. As indicated above in conjunction with FIG. 2, the SQL statements from the program source code 300 specify only the desired data, but not how to retrieve the data. The optimize and bind step 312 may optimize the SQL query in a manner described in more detail later in this specification. Thereafter, the optimize and bind step 312 considers both the available access paths (indexes, sequential reads, etc.) and system held statistics on the data to be accessed (the size of the table, the number of distinct values in a particular column, etc.), to choose what it considers to be the most efficient access path for the query. The load module 310 and QEP 314 are then executed together at step 316.

Description of the Optimization Technique

The present invention discloses an improved optimization technique for cost-based routing of ASTs that is typically performed at step 202 of FIG. 2 or step 312 of FIG. 3. The operation of the present invention can best be understood in context, i.e., using a real-world example, such as a data warehouse application performed by the RDBMS software. Consider the following examples.

The following SQL statement defines a table "employee", which stores records for each employee in a company.
CREATE TABLE EMPLOYEES(
EMPNO INT,
LOCATION CHAR(50),
SALARY FLOAT,
DEPARTMENT CHAR(4));
The following SQL statement defines the AST rich-employees, wherein this table contains only the records for employees which make over $100,000, as specified by the query in the table definition:
CREATE TABLE RICH-EMPLOYEES AS
(SELECT LOCATION AS RICH-LOCATION,
EMPNO AS RICH-EMPNO)
FROM EMPLOYEE
WHERE SALARY>100,000);
Cearly, this AST can be used as a starting point to satisfy Query 1 provided below, which returns all Pittsburgh employees making over $100,000:
QUERY 1:
SELECT EMPNO
FROM EMPLOYEE
WHERE SALARY>100,000 AND LOCATION= 'PITTSBURGH';
This query seeks Pittsburgh employees which make over $100,000. Employees not in Pittsburgh are simply filtered out when accessing the AST. Query 2 provided below illustrates this idea by showing the equivalent query against the AST.
QUERY2:
SELECT EMPNO
FROM RICH-EMPLOYEES
WHERE LOCATION='PITTSBURGH';
An execution plan for this query night be significantly faster when the percentage of all employees making over $100,000 is small.

Overview of the AST Routing Decision

The decision as to whether to use an AST to optimize query performance is known as "routing". In the preferred embodiment, routing is done automatically by the RDBMS software during query optimization steps.

The routing process can be broken down into two distinct logical phases: matching and costing. The matching phase determines the set of ASTs whose contents can be used as a starting point to answer the query. The costing phase then decides which subset of these ASTs will improve query performance and constructs an optimal QEP using these ASTs.

AST Routing Heuristics

Much of the prior art regarding AST routing focuses on the matching aspect. Little is said about the costing aspect of routing. Most approaches to AST costing use heuristics to decide whether routing to an AST would improve performance.

Some heuristics are as simple as making the decision to route simply if the AST definition has a grouping requirement. Others consider some crude measure in deciding the benefit of routing. For example, the cardinality reduction done by an AST may be considered as a means of deciding to route to it and as a means of deciding between multiple candidate ASTs, as described in R. Bello, K. Dias, A. Downing, J. Feenan, J. Finnerty, W. Norcott, H. Sun, A. Witkowski, and M. Ziauddin, Materialized Views In Oracle, Proceedings of the 24th VLDB Conference, New York, 1998, which publication is incorporated by reference herein.

Besides cardinality reduction, a myriad of other factors should be considered as well, such as:

Access paths (e.g., indexes, join methods) available for accessing the AST and for performing compensation.

AST properties that can be exploited, such as order, partitioning, unique keys, functional dependencies, etc., as described in D. Simmen et. al, Fundamental Techniques of Order Optimization, Proceedings of the ACM-SIGMOD International Conference on Management of Data, Montreal, June 1996, which publication is incorporated by reference herein.

RDBMS software and computer system 100 configuration.

These are some of the many factors that are considered by optimizers when determining an optimal QEP.

The architectures of many cost-based optimizers are based upon the design of System R, which is described in P. G. Selinger et al., Access Path Selection in a Relational Database Management System, Proceedings of the ACM-SIGMOD International Conference on Management of Data, Boston, June 1979, which publication is incorporated by reference herein. System R used a dynamic programming search algorithm to find a provably optimal QEP. This approach was later extended to work with a multi-dimensional cost metric, as described in S. Ganguly, W. Hasan, and R. Krishnamurthy, Query Optimization for Parallel Execution, Proceedings of the 1992 ACM SIGMOD Conference, May 1992, which publication is incorporated by reference herein.

The present invention further extends this traditional cost-based optimization architecture to solve the AST routing problem. In particular, the solution presents a novel way of expanding the execution space of this architecture to allow consideration of QEPs involving ASTs, in addition to the usual set of QEPs that would be considered for the query. The extension has two key aspects:

Prior to execution of the search algorithm, ASTs that overlap the query are identified by matching available AST definitions with query requirements. One of the key aspects of the present invention is that the query requirements satisfied by the AST, and other relevant information, be encapsulated as a set of properties.

The execution space is then extended by supplementing the QEPs typically generated by an optimization rule, with QEPs representing AST access paths (e.g., table scan, index scan).

The solution is provably optimal when a multi-dimensional dynamic programming search algorithm is used in conjunction with this extension.

The AST properties resulting from the matching phase include relational properties such as the tables referenced, columns supplied, expressions computed, predicates applied, unique keys and functional dependencies in effect, aggregation performed, and so on. One of the key ideas is that these properties characterize the work done by the AST in terms of the query. This allows the optimizer to:

determine when QEPs for candidate ASTs can be used to supplement the QEPs generated by an optimization rule, compare these QEPs to other QEPs for the purpose of pruning the search space, and compensate these QEPs in response to the requirements of subsequent optimization rules.

Consider the following example. Table 1 below describes the properties characterizing the work of the rich-employee AST in terms of the tables, columns, and predicates requirements of Query 1:

TABLE 1:
TABLES: EMPLOYEE
COLUMNS: EMPNO, LOCATION
PREDICATES: SALARY>100,000
COLUMN MAPPING: EMPNO->RICH-EMPNO, LOCATION->RICH-LOCATION

This information would be used during optimization of Query 1 to determine that QEPs representing access to the employees table can be supplemented with QEPs for the rich-employee AST. Moreover, it can be used to determine that the predicate "location='Pittsburgh'" is the only predicate which remains to be applied.

Another important property encapsulated with the AST is the information needed to map query requirements back to processing requirements against the AST. For example, before the predicate "location='Pittsburgh'" can be applied to the rich-employees AST, it must be translated to "rich-location='Pittsburgh'". This is required because matching columns maybe in different positions in their respective tables. Table 1 shows the column mapping information for the rich-employees AST and Query 1.

The section below entitled "Optimal AST Routing" illustrates how this information is used to extend the optimization architecture.

Cost-Based Query Optimization

This section provides an overview of the cost-based query optimization architecture employed by many commercial database management systems. The term query is used loosely to refer to INSERT, UPDATE, and DELETE statements as well as SELECT statements. There are several optimization phases; however, the focus is on the one where traditional cost-based optimization occurs. This phase is known as plan generation. In the next section, the changes to the plan generation phase required for the invention are described.

QGM and Query Rewrite

As noted above, prior to generation of the QEP, a query, and any views it references, is rendered into an internal form known as a query graph model (QGM). A QGM represents a semi-procedural dataflow graph of a query, wherein the QGM is basically a high-level, graphical representation of the query.

In QGM, boxes are used to represent relational operations, while arcs between boxes are used to represent quantifiers, i.e., table references. Each box includes the predicates that it applies, an input or output order specification (if any), a distinct flag, and so on. The basic set of boxes includes those for SELECT, GROUP BY, and UNION. A join operation is represented by a SELECT box with two or more input quantifiers, while an ORDER BY operation is represented by a SELECT box with an output order specification.

After its construction, a QGM goes through the query rewrite optimization phase. Query rewrite transforms a QGM into a semantically equivalent QGM that is more readily optimized during plan generation. Techniques such as view merging, subquery-to-join transformation, and predicate transitive closure are performed during query rewrite.

Many query rewrite optimization techniques using QGM have been performed in the prior art, as disclosed in Hamid Pirahesh, Joseph Hellerstein, and Waqar Hasan, "Extensible/Rule Based Query Rewrite Optimization in STARBURST," Proceedings of ACM SIGMOD '92 International Conference on Management of Data, San Diego, Calif., 1992, which publication is incorporated by reference herein.

The QEP Model

During the generation of a QEP, the QGM is traversed and the QEP is generated. The QEP specifies the sequence of database operations used to satisfy the query. Many alternatives QEPs are considered. The best alternative is typically identified based upon cost.

A typical data-flow graph representation of QEPs is used herein. This data-flow graph representation is described in G. M. Lohnman, Grammar-Like Functional Rules for Representing Query Optimization Alternatives, Proceedings of ACM SIGMOD Conference, May, 1988, which publication is incorporated by reference herein.

In the QEP, nodes or operators correspond to database operations, such as table scan (SCAN), index scan, (ISCAN), nested-loops-join (NLJN), group-by (GRBY), sort (SRT), etc. Operators consume one or more tables, or tuple streams, and produce a tuple stream. Each tuple stream has an associated set of properties which summarize important relational (e.g., tables accessed, predicate applied), physical (e.g., order), and estimated (e.g., cardinality, cost) characteristics. Each operator has certain parameters, or arguments, which characterize how it operates upon the input data streams. For example, a SRT operator accepts the ordering requirement as an argument, and an ISCAN operator accepts the name of the index and predicates used to form the search key as arguments.

Figure 4A:
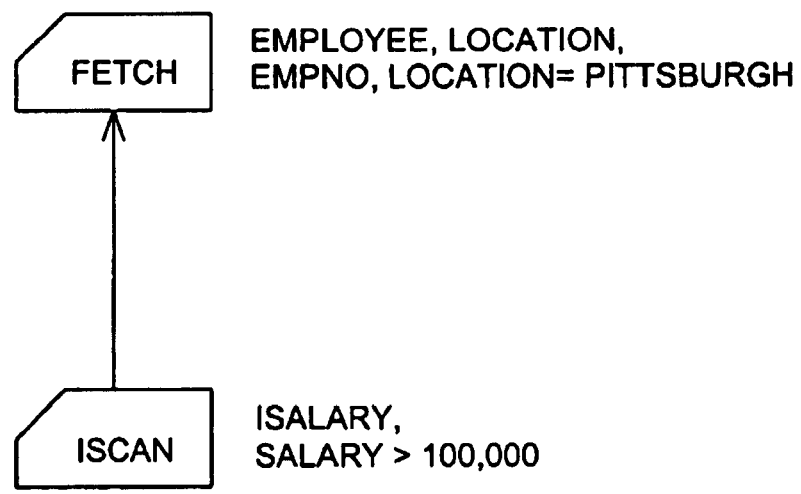
FIGS. 4A and 4B are data-flow graph representations of alternative query execution plans for an exemplary query according to the preferred embodiment of the present invention.
Figure 4B:

FIGS. 4A and 4B are data-flow graph representations of alternative QEPs for Query 1 above, i.e., QEP1 and QEP2, respectively, and Tables 2A and 2B below describe the properties of QEP1 and QEP2:

TABLE 2A

QEP1 PROPERTIES:

TABLES: EMPLOYEE
COLUMNS: EMPNO, LOCATION, SALARY
PREDICATES: SALARY > 100,000, LOCATION = 'PITTSBURGH'
ORDER: SALARY
COST: 50,000

TABLE 2B

QEP2 PROPERTIES:

TABLES: EMPLOYEE
COLUMNS: EMPNO, LOCATION, SALARY
PREDICATES: SALARY > 100,000, LOCATION = 'PITTSBURGH'
ORDER: SALARY
COST: 100,000

QEP1 represents an index access to the employee table. The index is on the salary column and is used with the predicate "salary>100,000" to directly access records of employees whose salaries exceed 100,000. Qualifying records are subsequently retrieved from the employee table and further qualified by the predicate "location='Pittsburgh'". The ISCAN operator represents the use of the index. Its arguments include the name of the index to be used and the predicate used to form the search key. The FETCH operator represents the access to employee records qualifying from the index scan. Its arguments include the name of the table to be accessed and any remaining predicates to be applied to those records.

QEP2 represents a full table scan of the employee table. Each record of the table is accessed and qualified against the predicates "location='Pittsburgh'" and "salary>100,000". The SCAN operator represents this access. Its arguments include the name of the table to access and predicates to apply.

Rules and Requirements

Optimization rules for generating QEPs define the legal ways operators can be composed into QEPs. An optimization rule accepts a set of requirements as input and produces a set of QEPs whose properties satisfy the requirements. A rule may call other rules in the process.

In addition to building plans that satisfy the required properties, a rule may use a technique called iteration to build QEPs that satisfy additional properties it believes will be interesting to rules called during subsequent stages of plan generation.

For example, an "access rule" is responsible for producing QEPs that represent ways to access a database table. It may, in turn, call a "table scan rule" and an "index scan rule" to subcontract the work. The requirements to the access rule would include the names of the table to be accessed, the columns that are required for further processing (e.g., joins, aggregation), and the predicates to apply.

Table 3 below shows an example of the requirements passed to the invocation of the access rule that produced QEP1 and QEP2 of Table 2.

TABLE 3

TABLES: EMPLOYEE
COLUMNS: EMPNO, LOCATION, SALARY
PREDICATES: SALARY > 100,000, LOCATION = 'PITTSBURGH'

Note that both QEP1 and QEP2 have equivalent relational properties. Although they differ in physical properties (e.g., order) and estimated properties (e.g., cost), their respective relational properties satisfy the initial access rule requirements.

The Search Strategy

The search space defines the set of all alternative QEPs that will be considered for a QGM. The search strategy refers to the method of navigating the search space. QEPs are built in a bottom-up fashion with respect to a QGM, i.e., QEPs representing database table access are built first, then QEPs for progressively larger and larger joins, then perhaps QEPs for aggregation, and so on. QEPs built in previous steps are used as sub-plans for the current step.

A sub-plan may require additional work to satisfy the requirements of an optimization rule. For example, it may be necessary to apply additional predicates, retrieve additional columns, perform aggregation, or add sorts. In essence, compensation is performed on sub-plans in response to requirements of rules invoked in subsequent steps of bottom-up processing. The idea is illustrated by the glue rule proposed in G. M. Lohman, Grammar-Like Functional Rules for Representing Query Optimization Alternatives, Proceedings of ACM SIGMOD Conference, May, 1988, which publication is incorporated by reference herein.

The glue rule is a common rule used by other rules to compensate sub-plans. This rule can be extended to perform some of the more advanced compensation techniques such as joins back to the base table to retrieve additional columns. The present invention assumes that these techniques exist.

Various search strategies have been proposed to enumerate joins. A dynamic programming strategy is an exhaustive method that comes up with a provably optimal QEP, as described in P. G. Selinger et al., Access Path Selection in a Relational Database Management System, Proceedings of the ACM-SIGMOD International Conference on Management of Data, Boston, June 1979, which publication is incorporated by reference herein. A "greedy" strategy can not guarantee an optimal plan, but provides a means for a more efficient search.

To make the optimization process more tractable, sub-optimal subplans are pruned during the search. Typically, pruning is multi-dimensional in nature. The multi-dimensional aspect refers to the use of properties in addition to total cost when determining sub-optimality, and in the use of iteration to produce QEPs with interesting properties. Multi-dimensionally is required in order to satisfy the principle of optimality central to dynamic programming, as described in S. Ganguly, W. Hasan, and R. Krishnamurthy, Query Optimization for Parallel Execution, Proceedings of the 1992 ACM SIGMOD Conference, May 1992, which publication is incorporated by reference herein.

Since the invention produces AST access QEPs that have properties written in terms of the query, these QEPs can be compensated using existing compensation methods for sub-plans. Moreover, they can be compared for optimality using existing pruning metrics.

Cost Model

Various cost metrics can be used to model the execution characteristics of a QEP. The cost metric chosen depends upon the optimization goal in effect. For example, in an on-line transactional processing environment, the optimization goal maybe to find a QEP that minimizes system resource consumption. To achieve this goal, the optimizer may use a cost metric which models total work performed by the QEP. For example, a cost metric formed via a weighted combination of the CPU and I/O resources consumed by a QEP is described in P. G. Selinger et al., Access Path Selection in a Relational Database Management System, Proceedings of the ACM-SIGMOD International Conference on Management of Data, Boston, June 1979, which publication is incorporated by reference herein.

In a parallel processing environment, the optimization goal may be to minimize response time. Thus, a cost metric that factors in communication cost and overlap in processing may be used, as described in S. Ganguly, W. Hasan, and R. Krishnamurthy, Query Optimization for Parallel Execution, Proceedings of the 1992 ACM SIGMOD Conference, May 1992, which publication is incorporated by reference herein.

The present invention does not require changes to the cost model.

Optimal AST Routing

The present invention extends the traditional cost-based optimization architecture to provide an optimal solution to the AST routing problem. The extension has two key aspects:

Prior to execution of the search algorithm, a set of candidate ASTs are decided. Properties encapsulate the relational query requirements satisfied by each candidate AST. In addition to these relational properties, information for mapping between query requirements and AST processing requirements is included.

The execution space is then extended by supplementing the QEPs typically generated by an optimization rule, with QEPs representing AST access strategies (e.g., table scan, index scan).

This idea is illustrated by means of a simple example in the next section.

EXAMPLE

As described above, the optimizer determined during the matching phase that the rich-employees AST overlaps the requirements of Query 1. Table 1 showed the properties and mapping information associated with this AST. As described in the section above entitled "Rules and Requirements", during its normal bottom-up processing for this query, the optimizer invokes the access rule to build QEPs representing various access strategies. Table 3 illustrated the requirements used for one such access rule invocation for Query 1. FIGS. 4A and 4B showed alternative QEPs produced by this rule invocation and Tables 2A and Table 2B showed the properties of these QEPs.

The optimizer then looks to supplement these QEPs by invoking the access rule again and again, for each candidate AST whose properties overlap with the original rule requirements. (So, in this instance, the set of QEPs normally produced by the access rule are supplemented by using the access rule itself). Prior to each invocation, the original rule requirements are transformed into simpler requirements against the AST.

In this simple example, the rich-employees AST is the only candidate AST. The process of determining if the rich-employees AST overlaps the original access rule requirements of Table 3, and the transformation of these requirements proceeds as follows:

1. The optimizer compares the original table requirement of the access rule, "employee", to the table property of the rich-employees AST, "employee". Since the requirement and property are the same, this property overlaps the requirement. The optimizer then substitutes "employee" in the original requirement with "rich-employees", thus transforming the table requirement.

2. The optimizer then compares the predicate requirement, "salary>100,000, location='Pittsburgh'", with the predicate property of the AST, "salary>100,000". This property overlaps the requirement since the AST applies a subset of the required predicates. The optimizer then simplifies the original predicate requirement by removing the predicate "salary>100,000" from the requirement, since it is already applied by the rich-employees AST. Further, it uses the column mapping information of the AST to rewrite the predicate requirement in terms of the columns of the AST. In this case, the predicate is rewritten as "rich-salary>100,000". This allows the predicate to be applied to the rich-employee AST.

3. The optimizer then compares the column requirement "empno, location, salary", with the column property of the AST, "empno, location". At first, it appears that this test fails since the AST does not provide the salary column; however, this column is necessary only to apply the predicate "salary>100,000". Since this predicate has been removed from the predicate requirement in the previous step, the optimizer can then reduce the column property as well by eliminating the salary column from the column requirement. It can be seen that the column property overlaps the reduced column requirement. The reduced column requirement "empno, location" is then mapped to the rich-employees AST as "rich-empno, rich-location".

Table 4 shows the translated requirements for AST access rule invocation for Query

TABLE 4

TABLES: RICH-EMPLOYEES
COLUMNS: RICH-EMPNO, RICH-LOCATION
PREDICATES: RICH-LOCATION = 'PITTSBURGH'

The access rule is then invoked a second time with these requirements. Assume there is an index, location, on the rich-location column of the rich-employees AST. This second invocation of the access rule with these requirements would return two additional QEPs: one QEP representing a full scan of the rich-employee table applying only the predicate "rich-location='Pittsburgh'", and another QEP that uses the location index to directly access records of employees in Pittsburgh.

Figure 5A:
FIGS. 5A and 5B are data-flow graph representations of additional alternative query execution plans for an exemplary query according to the preferred embodiment of the present invention.
Figure 5B:
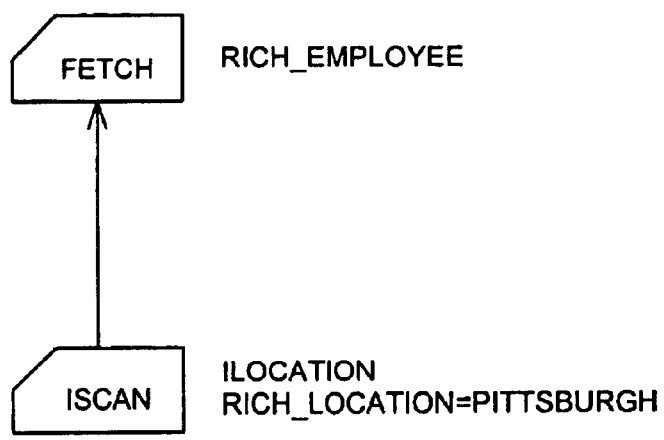

FIGS. 5A and 5B are data-flow graph representations of these two additional QEPs, i.e., QEP3 and QEP4, respectively, and Tables 5A and 5B below describe the properties of QEP3 and QEP4, respectively:

TABLE 5A

QEP3 PROPERTIES:

TABLES: EMPLOYEE
OOLUMNS: EMPNO, LOCATION, SALARY
PREDICATES: SALARY > 100,000, LOCATION = 'PITTSBURGH'
ORDER: NONE

TABLE 5B

QEP4 PROPERTIES:

TABLES: EMPLOYEE
COLUMNS: EMPNO, LOCATION, SALARY
PREDICATES: SALARY > 100,000, LOCATION = 'PITTSBURGH'
ORDER: LOCATION

The process of removing parts of a requirement already satisfied by an AST is known as "reducing" the requirement. The process of rewriting the requirement in terms of the AST is known as mapping the requirement. The above example showed that there is some dependence on the order of processing. For example, there is a need to reduce the predicate requirement before the column requirement could be reduced. Moreover, there is a need to reduce the column requirement before it can be determined that the column requirement overlaps the column property of the AST.

Note that although the requirements of the rule had been reduced and mapped to AST processing requirements (as illustrated by the QEP arguments), the QEP properties are expressed in terms of the query. Moreover, the properties characterize all work done by the QEP with respect to the query, rather than just the work done by the operators. This allows QEP3 and QEP4 to compete with QEP1 and QEP2. Thus, no changes to the multi-dimensional pruning algorithm are needed.

To illustrate the changes to the property computation necessary to achieve this result, again consider the previous example. In general, the properties of an operator are a function of their input properties and the work performed by the operator, as indicated by the arguments of the operator. The input properties of the SCAN operator are initialized to the relational properties of the rich-employees AST illustrated in Table 1. The SCAN arguments are then temporarily rewritten in terms of query requirements as follows:

the table requirement is temporarily mapped back to "employee", the column requirement is temporarily mapped back to "empno, location", and the predicate requirement is temporarily mapped back to "location='Pittsburgh'".

The property computation for the SCAN operator then proceeds as usual.

General Specification

The previous example illustrated the workings of the invention in terms of the preferred embodiment. It illustrated:

The characterization of the query work done by an AST with properties.

The process used to determine if the requirements of a rule overlap the properties of an AST.

Transformation of rule requirements to AST processing requirements.

Use of the access rule to supplement the QEPs built for another rule.

Modification of a property function for an operator that represents access to an AST.

In summary, QEPs representing access to AST A1 are used to supplement the QEPs produced by invoking optimization rule R, if the properties of A1 overlap the requirements of rule R. That is, they either satisfy the requirements of R, or can do so with compensation.

Prior to invoking the access rule for A1, the original set of requirements for R, written in terms of query tables and columns, are transformed to simpler and equivalent requirements against the AST. This transformation involves reducing each requirement by eliminating parts of the requirement already satisfied by AST properties, and then mapping the table and column references of the reduced requirements to AST table and column references.

The property computations of operators of QEPs produced by the access rule invocation are then modified so that the resulting QEPs have properties comparable to the original requirements. This allows the QEPs to be compared and pruned as usual. Moreover, compensation occurs naturally via the usual methods for augmenting sub-plans to satisfy the relational and physical requirement of an optimization rule (via the glue rule described in the section entitled "Rules and Requirements").

Minor changes to the property computation of table access operators such as SCAN, ISCAN, FETCH are required to achieve this result. If an operator, O, is used for accessing AST, A1, then O first initializes its input properties to the properties of A1. The arguments of O, which are now written in terms of the A1, are then translated back into terms of the query using the mapping information of A1. This process is known as "reverse mapping". The property computation then proceeds as usual using these initial properties and translated arguments.

One skilled in the art of query optimization can see from this description that these ideas can be easily generalized to extend any query optimization rule, as described in flowcharts provided below.

Logic of Creating the Summary Table

Figure 6:
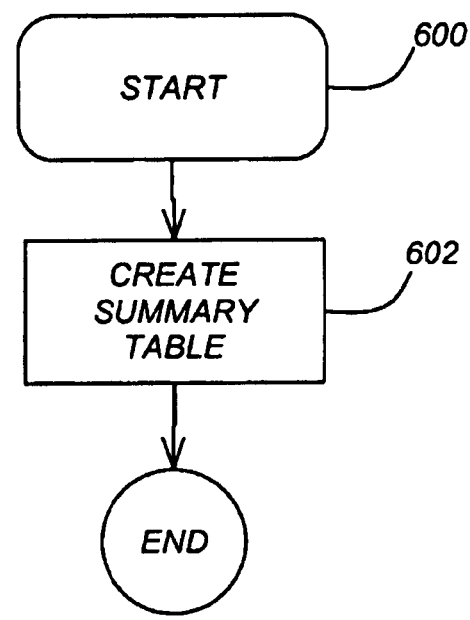
FIG. 6 is a flowchart illustrating the method of creating the summary table according to the preferred embodiment of the present invention.

FIG. 6 is a flowchart illustrating the method of creating the summary table according to the preferred embodiment of the present invention.

Block 600 represents the start of the logic.

Block 602 represents the computer system 100 creating an automatic summary table that contains the result of executing a query, wherein a definition of the summary table is based on a full select statement.

Thereafter, the logic terminates.

Logic of Optimizing Queries

Figure 7:
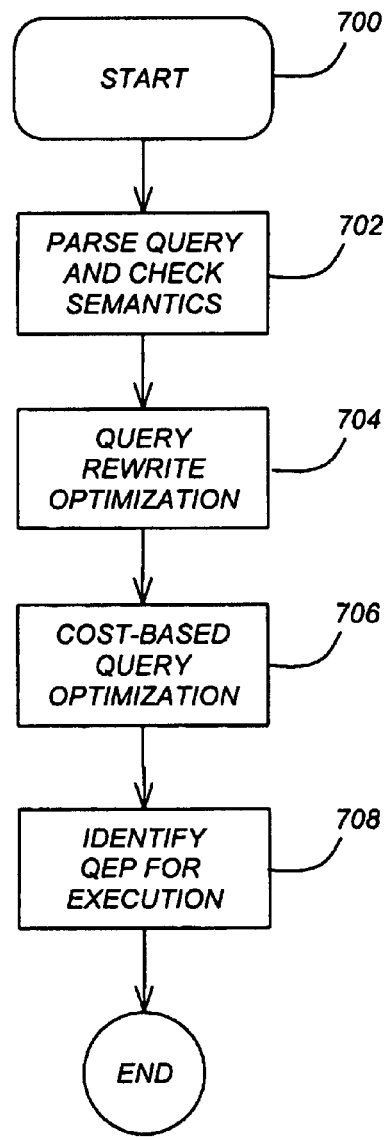
FIG. 7 is a flowchart illustrating the method of optimizing SQL queries in step 204 of FIG. 2 and step 314 of FIG. 3 according to the preferred embodiment of the present invention.

FIG. 7 is a flowchart illustrating the method of optimizing SQL queries in Block 202 of FIG. 2 and Block 314 of FIG. 3 according to the preferred embodiment of the present invention. In particular, it shows the context of the cost-based optimization phase that is extended to solve the AST routing problem in a cost-based fashion.

Block 700 represents the start of the logic.

Block 702 represents the computer system 100, specifically an optimizer function of the RDBMS software, accepting a query, parsing the query, checking the semantics of the query, and then rendering the query into QGM format.

Block 704 represents the optimizer rewriting the QGK using heuristics, into a form more easily optimized. Note that this is the phase where systems suffering from the limitations of the prior art typically make AST routing decisions.

Block 706 represents the optimizer performing a cost-based optimization, wherein a plurality of QEPs are generated and assigned a cost based upon their execution characteristics.

Block 708 represents the optimizer identifying a QEP for execution from among the alternative QEPs. Generally, the most efficient (e.g., lowest cost) such QEP is selected for execution.

After these query transformation steps are performed, control returns to block 202 in FIG. 2 or block 314 in FIG. 3 for subsequent processing steps, including the execution of the identified QEP against the relational database and the output of the result set.

Logic of Cost-Based AST Routing

Figure 8:
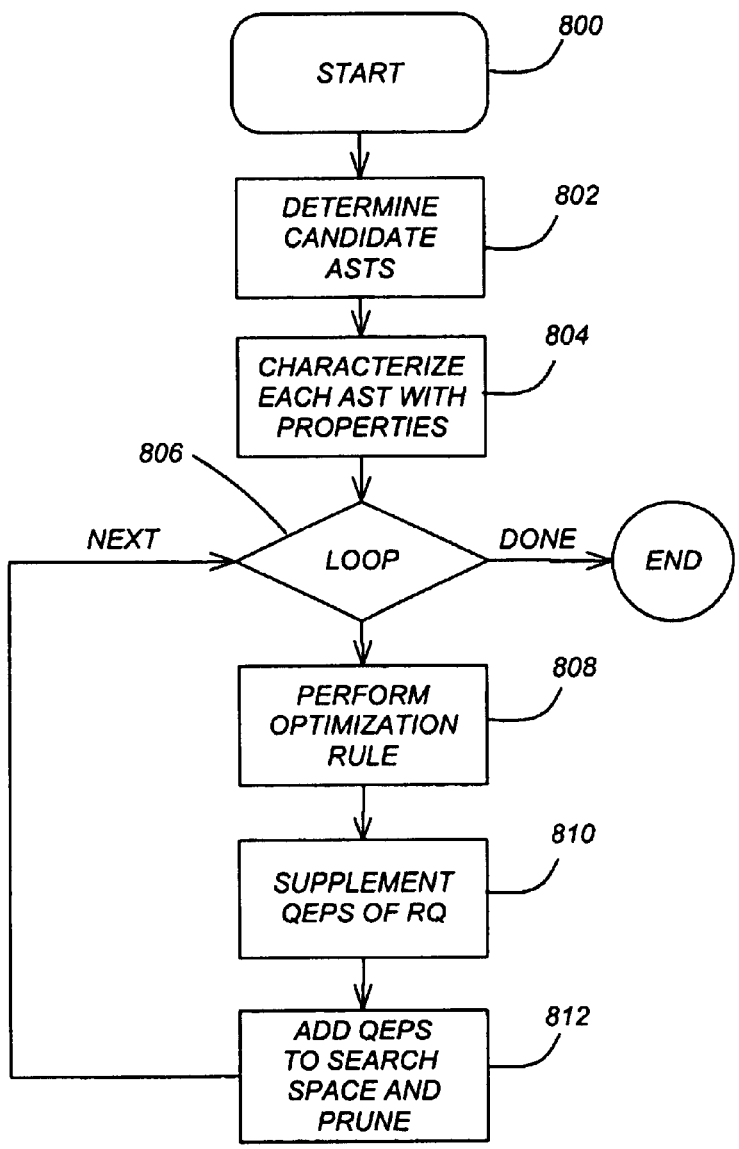
FIG. 8 is a flowchart further illustrating a method of optimizing SQL queries in Block 706 of FIG. 7 according to the preferred embodiment of the present invention.

FIG. 8 is a flowchart further illustrating a method of optimizing SQL queries in Block 706 of FIG. 7 according to the preferred embodiment of the present invention. In particular, it shows an extension of the cost-based optimization architecture of preferred embodiment for cost-based AST routing.

Block 800 represents the start of the logic.

Block 802 represents, prior to plan generation for query, Q, the optimizer determining the set of candidate ASTs, CT, for the query.

Block 804 represents the optimizer characterizing the work of each AST, A, in the set of candidate ASTs, CT, with N properties $A.P_1, A.P_2, \ldots, A.P_N$ and, MA, information for mapping between query and AST tables and columns.

Block 806 is a decision block that represents a loop being performed by the optimizer for each iteration of the bottom-up search strategy for a given QGM. For each iteration of the loop, control transfers to Block 808; upon completion, the logic terminates, which returns to Block 706 in FIG. 7 for subsequent processing steps.

Block 808 represents the optimizer invoking optimization rule R with M requirements $R_1, R_2, \ldots, R_M$ (where M<=N) with RQ representing the set of QEPs produced by this invocation.

Block 810 represents the optimizer supplementing RQ with QEPs representing access to all candidate ASTs, A, whose properties $A.P_1, A.P_2, \ldots, A.P_N$ overlap rule R's requirements $R_1, \ldots, R_M$.

Block 812 represents the optimizer adding QEPs in RQ to the search space, wherein a multi-dimensional pruning metric is used to eliminate sub-optimal QEPs. Thereafter, control returns to Block 806.

Logic of Property Evaluation

Figure 9:
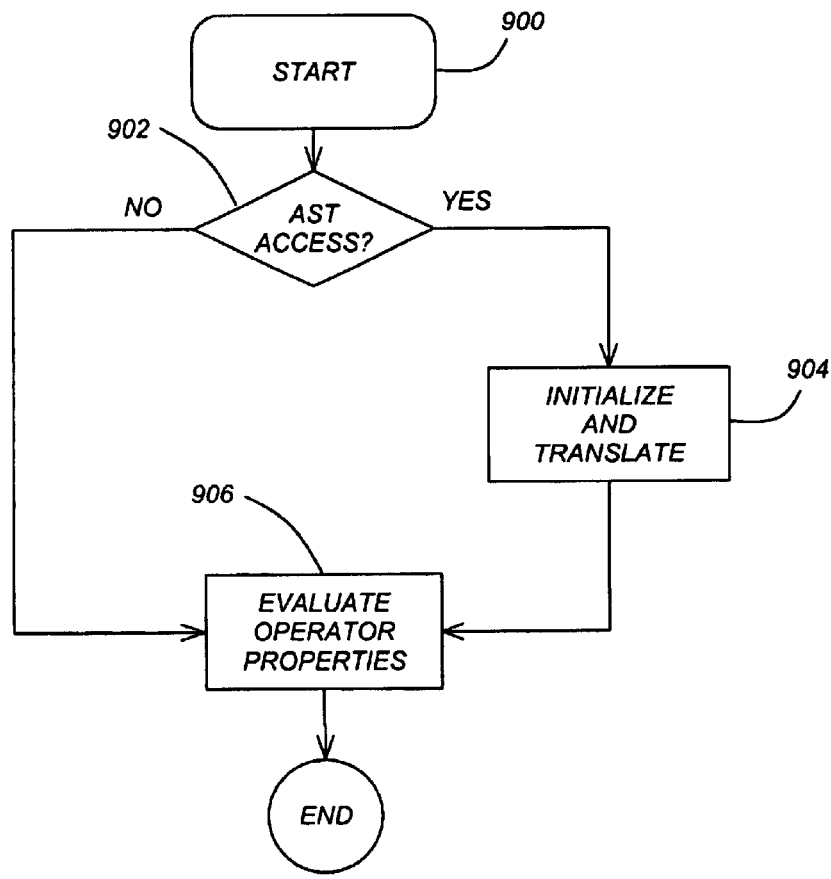
FIG. 9 is a flowchart further illustrating a method of evaluating the properties of any operators used in the construction of QEPs in Blocks 808 and/or 810 of FIG. 8 according to the preferred embodiment of the present invention.

FIG. 9 is a flowchart further illustrating a method of evaluating the properties (e.g., tables, predicates, order, cost, etc.) of any operators "O" used in the construction of QEPs in blocks 808 and/or 810 of FIG. 8 according to the preferred embodiment of the present invention.

Block 900 represents the start of the logic.

Block 902 is a decision block that represents the optimizer determining whether operator O is used to access an AST. If so, control transfers to Block 904; otherwise, control transfers to Block 906.

Block 904 represents the optimizer preparing for evaluation of the property function of operator O by both initializing the properties of the operator with AST properties (as determined in Block 804 of FIG. 8) and by translating the arguments of the operator using AST matching information (also determined in Block 804 of FIG. 8).

Block 906 represents the optimizer evaluating the properties of the operator in the usual way given the initialized properties and translated arguments.

Thereafter, control returns to the appropriate Block of FIG. 8.

Logic of Using AST Access QEPs to Supplement QEPs of an Optimization Rule

FIGS. 10A, 10B, 10C and 10D together are a flowchart that illustrates the general logic used in Block 810 of FIG. 8 where ASTs are used to supplement the QEPs produced by optimization rule R invoked with M requirements R1, . . . , RM.

Block 1000 represents the start of the logic.

Block 1002 is a decision block that represents the optimizer looping through each of the ASTs in CT. For each AST, control transfers to Block 1004. Upon completion of the loop, control transfers to Block 810 of FIG. 8.

Block 1004 is a decision block that represents the optimizer looping through each of the M requirements used in the invocation of rule R, i.e., by setting I=1 to M. For each requirement, control transfers to Block 1006; upon completion of the loop, control transfers to FIG. 10B via "A".

Block 1006 represents the optimizer initializing each reduced requirement, RRI, to the corresponding original requirement, RI.

Figure 10A:
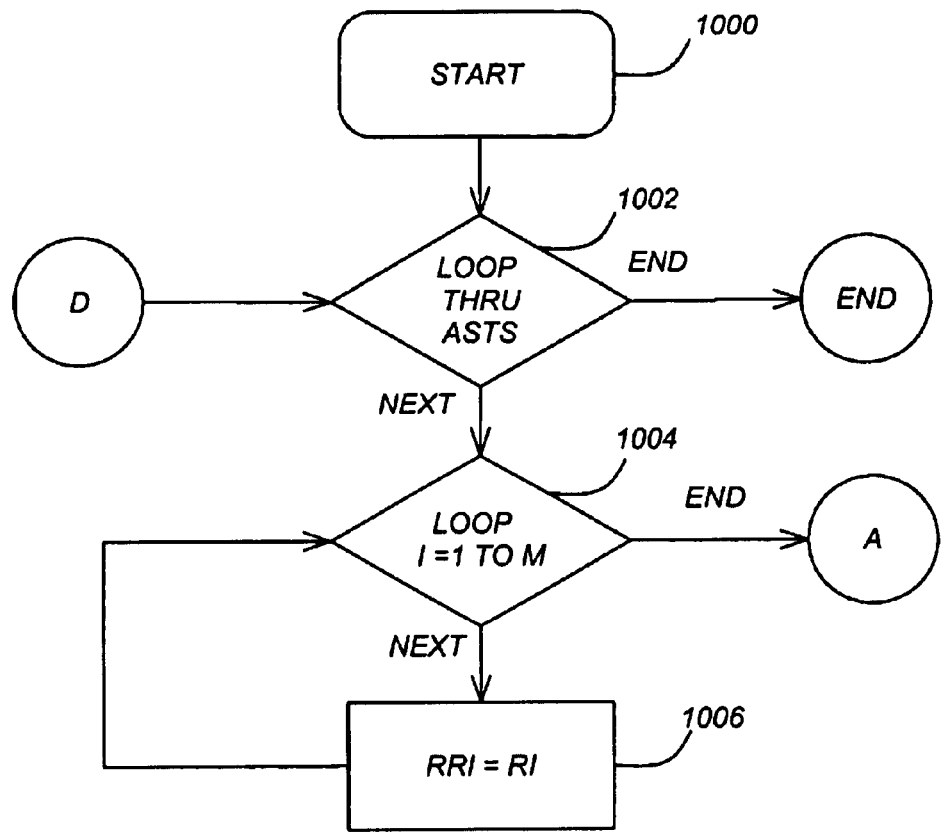
FIGS. 10A, 10B, 10C and 10D together are a flowchart that illustrates the general logic used in Block 810 of FIG. 8. wherein automatic summary tables are used to supplement the query execution plans produced by an optimization rule according to the preferred embodiment of the present invention.
Figure 10B:
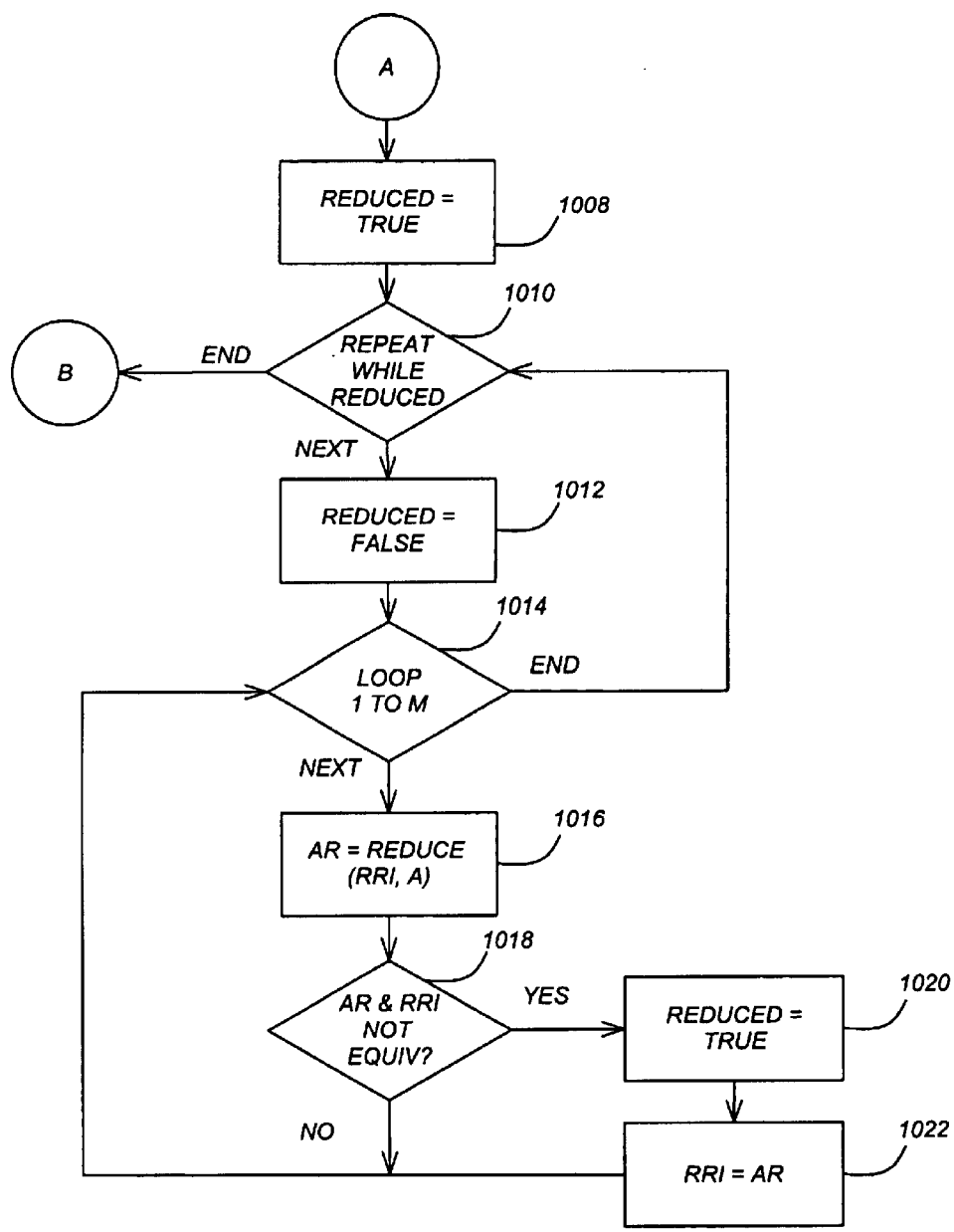

Referring to FIG. 10B, Block 1008 represents the optimizer setting the flag "REDUCED" to "true".

Block 1010 is a decision block that represents the optimizer attempting to reduce each reduced requirement further, i.e., the loop continues until no further reductions are possible, as indicated by the flag "REDUCED" being set to "false", which allows the optimizer to take into account the inter-dependencies of the reduction process where reducing one requirement may allow another to be reduced later. For each traverse of the loop, control transfers to Block 1012; upon completion of the loop, control transfers to FIG. 10C via "B".

Block 1012 represents the optimizer setting the flag "REDUCED" to "false". This indicates the initial assumption that all requirements should not be considered once again.

Block 1014 is a decision block that represents the optimizer looping through each of the reduced requirements $RR_i$, i.e., by setting i=1 to M. For each QEP, control transfers to Block 1016; upon completion of the loop, control transfers back to Block 1010.

Block 1016 represents the optimizer performing the REDUCE function with the parameters $RR_i$ and A. AR is set to the returned value from the REDUCE function, wherein the REDUCE function eliminates parts of the requirement RRI already satisfied by the AST A.

Block 1018 is a decision block that represents the optimizer determining whether AR and $RR_i$ are not equivalent. If so, control transfers to Block 1020; otherwise, control transfers back to Block 1014.

Block 1020 represents the optimizer setting the flag "REDUCED" to "true". This block indicates that a requirement has been further reduced (which is determined by testing that the result of reducing is not the same as the input requirement), and thus the flag is set indicating that all requirements should be considered once again.

Block 1022 represents the optimizer setting RRI to the value of AR. Thereafter, control transfers back to Block 1014.

Figure 10C:
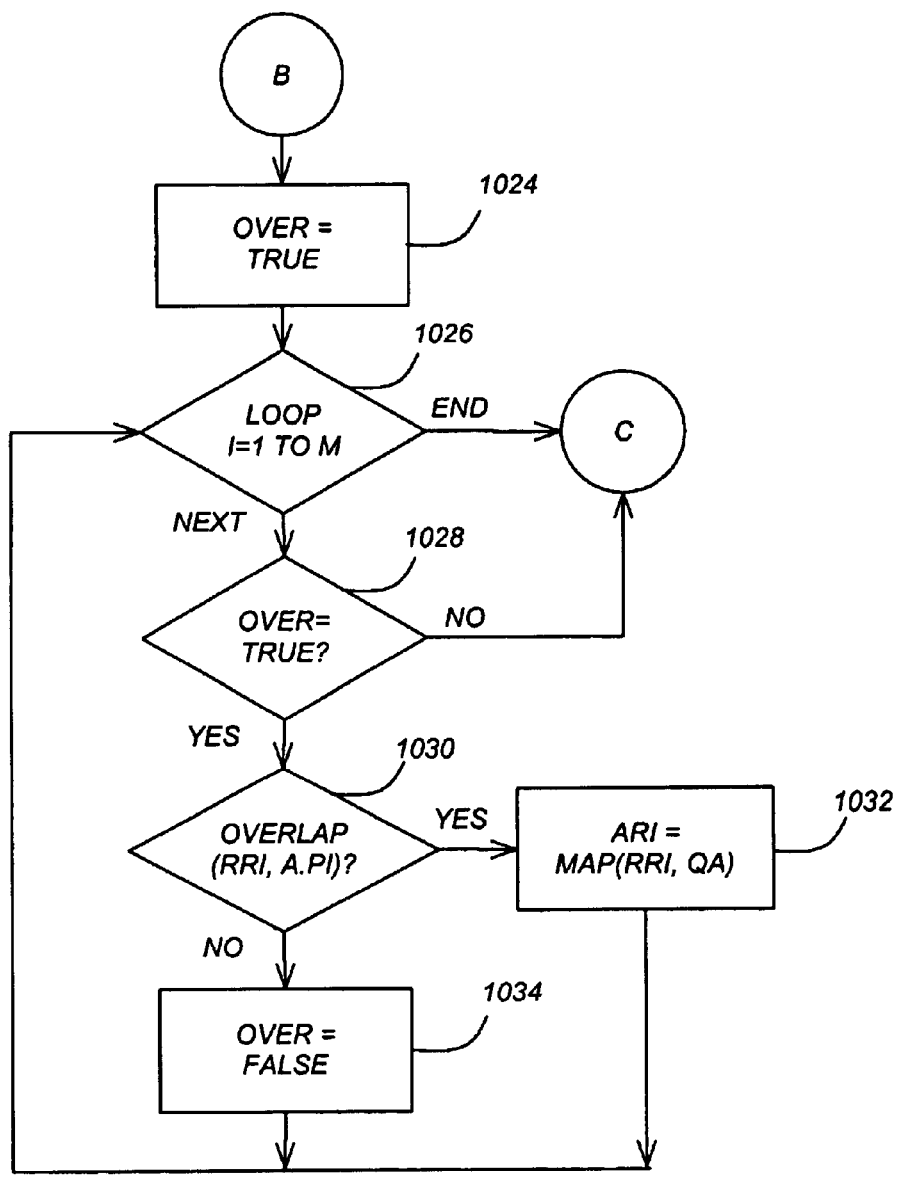

Referring to FIG. 10C, these steps represent the process of testing that each reduced rule requirement overlaps with the corresponding AST property, and the process of transforming the original requirements to AST processing requirements using AST mapping information.

Block 1024 represents the optimizer setting the flag "OVER" to "true".

Block 1026 is a decision block that represents the optimizer looping through each of the reduced requirements of optimization rule R, i.e., by setting i=1 to M. For each reduced requirement, control transfers to Block 1028; upon completion of the loop, control transfers to FIG. 10D via "C".

Block 1028 is a decision block that represents the optimizer determining whether the flag "OVER" is set to "true". If not, control transfers to FIG. 10D via "C"; otherwise, control transfers to Block 1030.

Block 1030 is a decision block that represents the optimizer calling the OVERLAP function with the reduced requirement $RR_i$ and the corresponding AST property $A.P_i$ to determine if they overlap, returning either a "true" or "false" value, accordingly. If a "true" value is returned, control transfers to Block 1032; otherwise, if a "false" value is returned, control transfers to Block 1034.

Block 1032 represents the optimizer calling the MAP function with parameters $RR_i$ and MA, and then sets $AR_i$ to the return value from the function, wherein the MAP function uses the matching information MA (encapsulated with the AST properties in Block 804 of FIG. 8) to map table and column references of RRI to equivalent table and column references of the AST.

Block 1034 represents the optimizer setting the flag "OVER" to "false" indicating that the current candidate AST does not overlap the rule requirements.

Thereafter, control transfers back to Block 1026.

Figure 10D:
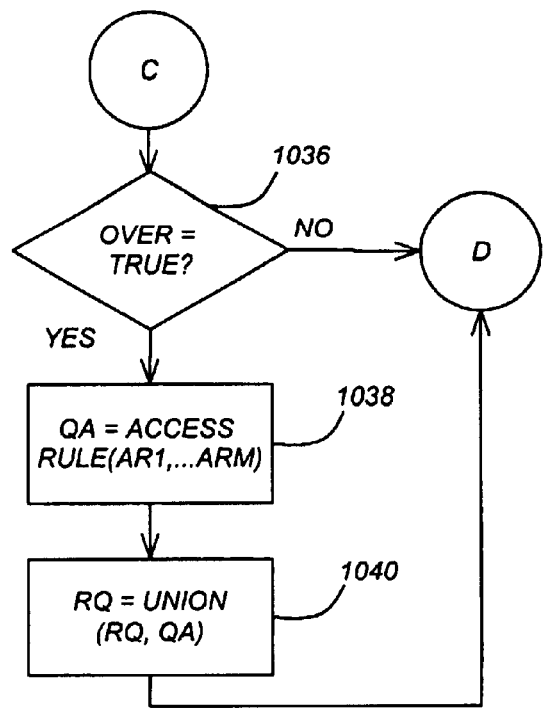

Referring to FIG. 10D, Block 1036 is a decision block that represents the optimizer determining whether the flag "OVER" is set to "true". If so, control transfers to Block 1038; control transfers to FIG. 10A via "D".

If all requirements overlap their corresponding properties, then Block 1038 represents the optimizer calling the ACCESS-RULE with the parameters including the transformed requirements $AR_1, \ldots, AR_M$, and then setting QA to the return value from the function, wherein the ACCESS-RULE produces QEPs that represent ways to access the AST.

Block 1040 represents the optimizer calling the UNION function with the parameters including RQ and QA, which are the resulting QEPs for this invocation, and then setting RQ to the return value from the function, wherein the UNION function adds the QEPs resulting from the invocation of the ACCESS-RULE in Block 1038 to the QEPs previously produced by invoking rule R with requirements $R_1, \ldots, R_M$.

Thereafter, control transfers to FIG. 10A via "D".

Logic of Computing Properties

Figure 11:
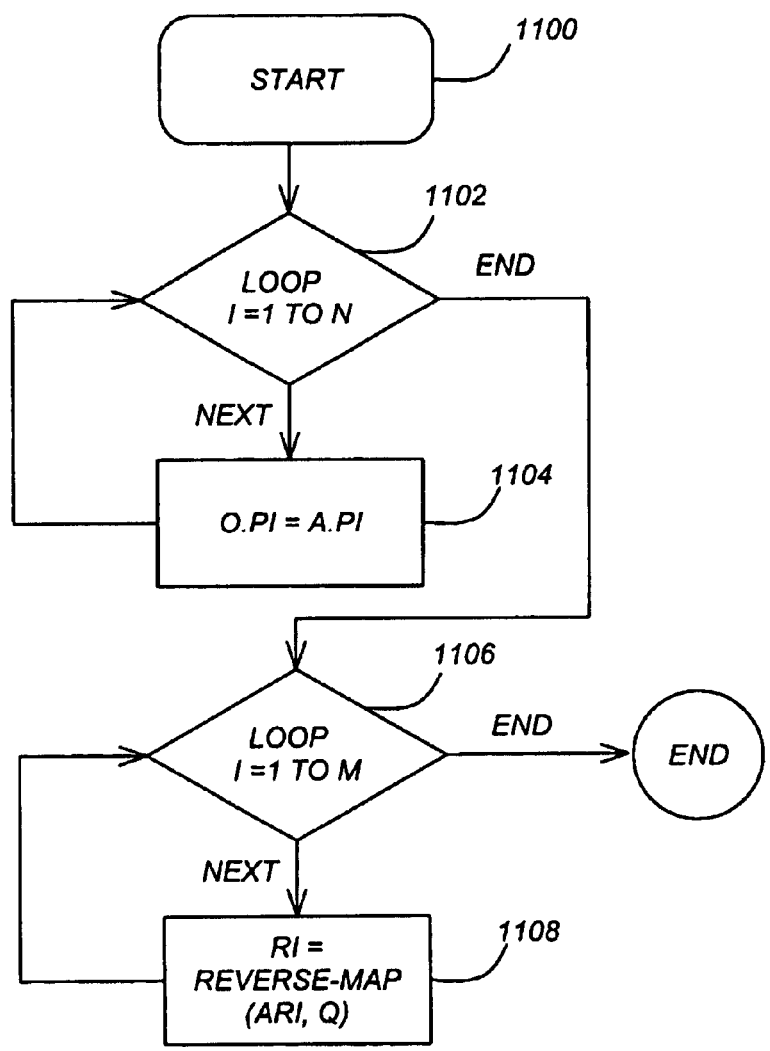
FIG. 11 is a flowchart illustrating the general logic of computing properties for query execution plans such that they can compared properly according to the preferred embodiment of the present invention.

FIG. 11 is a flowchart illustrating the general logic in Block 904 of FIG. 9, wherein, according to the preferred embodiment of the present invention, properties for QEPs are computed such that they can be compared properly in Block 812 of FIG. 8.

Block 1100 represents the start of the logic.

Block 1102 is a decision block that represents the optimizer looping through each of the properties of QEP operator O, i.e., by setting i=1 to N. For each traverse of the loop, control transfers to Block 1104; upon completion of the loop, control transfers to Block 1106.

Block 1104 represents the optimizer initializing each property of O, $O.P_i$, to the corresponding AST property, $A.P_i$. Thereafter, control transfers back to Block 1102.

Block 1106 is a decision block that represents the optimizer looping through each of the arguments ARI of operator O, i.e., by setting i=1 to M. For each traverse of the loop, control transfers to Block 1108; upon completion of the loop, the logic terminates and control returns to Block 904 of FIG. 9, for subsequent processing steps, including the evaluation of the properties of O using the initialized properties and translated processing requirements.

Block 1108 represents the optimizer calling the REVERSE-MAP function with the parameters including $AR_i$ and MA, and then setting $R_i$ to the return value from the function, wherein the REVERSE-MAP function uses the matching information MA computed in Block 804 of FIG. 8 to temporarily translate $AR_i$, written in terms of AST tables and columns in Block 1032 of FIG. 10C, into processing requirements written in terms of query tables and columns.

Conclusion

This concludes the description of the preferred embodiment of the invention. The following describes some alternative embodiments for accomplishing the present invention. For example, any type of computer, such as a mainframe, minicomputer, or personal computer, could be used with the present invention. In addition, any software program adhering (either partially or entirely) to the SQL language could benefit from the present invention.

In summary, the present invention discloses a method, apparatus, and article of manufacture for optimizing database queries using automatic summary tables. Query execution plans derived from an automatic summary table can be used to generate results for the query if a comparison of the query requirements with an automatic summary table definition determines that the automatic summary table overlaps the query, and if an optimization process determines that using the summary table will lower the cost of the query. The optimization process involves enumerating a plurality of query execution plans for the query, wherein the query execution plans enumerated include those that access combinations of query and summary tables. Each such query execution plan is assigned a cost representing an estimation of its execution characteristics, and the least costly query execution plan is selected for the query.

The foregoing description of the preferred embodiment of the invention has been presented for the purposes of illustration and description. It is not intended to be exhaustive or to limit the invention to the precise form disclosed. Many modifications and variations are possible in light of the above teaching.

What is claimed is:

1. A method of optimizing a query in a computer, the query being performed by the computer to retrieve data from a database stored on the computer, the method comprising the steps of:
   (a) identifying one or more automatic summary tables (ASTs) that overlap the query by matching definitions of the ASTs with requirements of the query, wherein the requirements of the query satisfied by an AST are encapsulated as a set of properties;
   (b) enumerating one or more alternative query execution plans (QEPs) for the query, including at least one QEP that represents one or more access paths of the identified ASTs;
   (c) assigning a cost to each of the alternative QEPs; and
   (d) choosing a most efficient one of the alternative QEPs based upon the assigned costs.

2. The method of claim 1, wherein the identifying step comprises comparing the requirements of the query and the definitions of at least one of the ASTs to determine whether the AST and the query overlap.

3. The method of claim 2, wherein the comparing step comprises determining the requirements of the query satisfied by the AST and characterizing the requirements as properties.

4. The method of claim 3, wherein the properties are selected from a group comprising tables referenced, columns supplied, expressions computed, predicates applied, unique keys and functional dependencies in effect, aggregation performed, and column mapping information.

5. The method of claim 1, wherein the enumerating step comprises using dynamic programming to exhaustively enumerate the alternative QEPs, thereby obtaining an optimal result for the query.

6. The method of claim 1, wherein the enumerating step comprises:
   invoking at least one optimization rule R with requirements $R_1, \ldots, R_M$ to generate a set of QEPs, RQ, wherein the properties of each QEP in RQ satisfies the requirements $R_1, \ldots, R_M$;

supplementing the QEPs in RQ with QEPs that access at least one of the ASTs and have properties $A.P_1, \ldots, A.P_M$ that overlap the requirements $R_1, \ldots, R_M$; and pruning the QEPS in RQ using a multi-dimensional pruning metric.

7. The method of claim 6, wherein the supplementing step comprises:

determining a set of processing requirements $AR_1, \ldots, AR_M$ for an AST;

invoking an access rule for the AST with the processing requirements $AR_1, \ldots, AR_M$ to obtain a set of QEPs, QA, for accessing the AST; and adding the set of QEPs, QA, to the set of QEPs, RQ.

8. The method of claim 7, wherein the determining step comprises:

reducing the requirements $R_1, \ldots, R_M$ to requirements $RR_1, \ldots, RR_M$ by removing components of each requirement $R_i$ already satisfied by a corresponding property $A.P_i$ of the AST;

determining whether each of the reduced requirements RRI overlaps with the corresponding property $A.P_i$ of the AST; and mapping each of the reduced requirements $RR_1, \ldots, RR_M$ to processing requirements $AR_1, \ldots, AR_M$ of the AST by substituting table and column references in $RR_i$ with corresponding table and column reference of the AST using matching information QA encapsulated as a property of the AST.

9. The method of claim 8, herein the reducing step comprises iteratively reducing the requirements $R_1, \ldots, R_M$ to reduced requirements $RR_1, \ldots, RR_M$ until no further reduction is possible.

10. The method of claim 7, wherein the invoking step comprises computing properties of at least one QEP operator O representing an access to the AST.

11. The method of claim 10, wherein the computing step comprises:

initializing each property $O.P_i$ of the operator O with the corresponding property $A.P_i$ of the AST;

mapping each of the processing requirements $AR_1, \ldots, AR_M$ to query requirements $R1, \ldots, RM$ by substituting table and column references in $AR_i$ with corresponding table and column reference of the query as described in the matching information QA encapsulated as a property of the AST; and invoking a property function for the operator O with the initialized properties $O.P_1, \ldots, O.P_N$ and the processing requirements $R_1, \ldots, R_M$.

12. The method of claim 1, wherein the enumerating step comprises:

invoking at least one optimization rule with the requirements of the query to generate a set of QEPs, wherein the properties of each QEP in the set of QEPs satisfies the requirements of the query;

supplementing the QEPs in the set of QEPs with additional QEPs that access at least one of the ASTs and have properties that overlap the requirements of the query; and pruning the QEPs in the set.

13. The method of claim 12, wherein the supplementing step comprises:

determining a set of processing requirements for an AST;

invoking an access rule for the AST with the processing requirements of the AST to obtain the additional QEPs that access the ASTs; and supplementing the QEPs in the set of QEPs with the additional QEPs.

14. The method of claim 13, wherein the determining step comprises:

reducing the requirements of the query by removing components of each requirement already satisfied by a corresponding property of the AST;

determining whether each of the reduced requirements of the query overlaps with the corresponding property of the AST; and mapping each of the reduced requirements of the query to the processing requirements of the AST by substituting table and column references in the reduced requirement with corresponding table and column references of the AST using matching information encapsulated as a property of the AST.

15. The method of claim 14, wherein the reducing step comprises iteratively reducing the requirements of the query until no further reduction is possible.

16. The method of claim 13, wherein the invoking step comprises computing properties of at least one QEP operator representing an access path of the AST.

17. The method of claim 16, wherein the computing step comprises:

initializing each property of the operator with the corresponding property of the AST;

mapping each of the processing requirements of the AST to the requirements of the query by substituting table and column references in the processing requirements of the AST with corresponding table and column references of the query as described in matching information encapsulated as a property of the AST; and invoking a property function for the operator with the initialized properties of the operator and the processing requirements of the AST.

18. A computer-implemented apparatus for optimizing a query, wherein the query is performed by the computer to retrieve data from a database stored on the computer, the apparatus comprising:

(a) a computer;

(b) logic, performed by the computer, for:

(1) identifying one or more automatic summary tables (ASTs) that overlap the query by matching definitions of the ASTs with requirements of the query, wherein the requirements of the query satisfied by an AST are encapsulated as a set of properties;

(2) enumerating one or more alternative query execution plans (QEPs) for the query, including at least one QEP that represents one or more access paths of the identified ASTs;

(3) assigning a cost to each of the alternative QEPs; and (4) choosing a most efficient one of the alternative QEPs based upon the assigned costs.

19. The apparatus of claim 18, wherein the logic for identifying comprises logic for comparing the requirements of the query and the definitions of at least one of the ASTs to determine whether the AST and the query overlap.

20. The apparatus of claim 19, wherein the logic for comparing comprises logic for determining requirements of the query satisfied by the AST and characterizing the requirements as properties.

21. The apparatus of claim 20, wherein the properties are selected from a group comprising tables referenced, columns supplied, expressions computed, predicates applied, unique keys and functional dependencies in effect, aggregation performed, and column mapping information.

22. The apparatus of claim 18, wherein the logic for enumerating comprises logic for using dynamic programming to exhaustively enumerate the alternative QEPs, thereby obtaining an optimal result for the query.

23. The apparatus of claim 18, wherein the logic for enumerating comprises logic for:

invoking at least one optimization rule R with requirements $R_1, \ldots, R_M$ to generate a set of QEPs, RQ, wherein the properties of each QEP in RQ satisfies the requirements $R_1, \ldots, R_M$;

supplementing the QEPs in RQ with QEPs that access at least one of the ASTs and have properties $A.P_1, \ldots, A.P_M$ that overlap the requirements $R_1, \ldots, R_M$; and pruning the QEPS in RQ using a multi-dimensional pruning metric.

24. The apparatus of claim 23, wherein the logic for supplementing comprises logic for:

determining a set of processing requirements $AR_1, \ldots, AR_M$ for an AST;

invoking an access rule for the AST with the processing requirements $AR_1, \ldots, AR_M$ to obtain a set of QEPs, QA, for accessing the AST; and adding the set of QEPs, QA, to the set of QEPs, RQ.

25. The apparatus of claim 24, wherein the logic for determining comprises logic for:

reducing the requirements $R_1, \ldots, R_M$ to requirements $RR_1, \ldots, RR_M$ by removing components of each requirement $R_i$ already satisfied by a corresponding property $A.P_i$ of the AST;

determining whether each of the reduced requirements RRI overlaps with the corresponding property $A.P_i$ of the AST; and mapping each of the reduced requirements $RR_1, \ldots, RR_M$ to processing requirements $AR_1, \ldots, AR_M$ of the AST by substituting table and column references in $RR_i$ with corresponding table and column reference of the AST using matching information QA encapsulated as a property of the AST.

26. The apparatus of claim 25, wherein the logic for reducing comprises logic for iteratively reducing the requirements $R_1, \ldots, R_M$ to reduced requirements $RR_1, \ldots, RR_M$ until no further reduction is possible.

27. The apparatus of claim 24, wherein the logic for invoking comprises logic for computing properties of at least one QEP operator O representing an access to the AST.

28. The apparatus of claim 27, wherein the logic for computing comprises logic for:

initializing each property O.PI of the operator O with the corresponding property $A.P_i$ of the AST;

mapping each of the processing requirements $AR_1, \ldots, AR_M$ to query requirements $R_1, \ldots, R_M$ by substituting table and column references in $AR_i$ with corresponding table and column reference of the query as described in the matching information QA encapsulated as a property of the AST; and invoking a property function for the operator O with the initialized properties $O.P_1, \ldots, O.P_N$ and the processing requirements $R_1, \ldots, R_M$.

29. The apparatus of claim 18, wherein the logic for enumerating comprises logic for:

invoking at least one optimization rule with the requirements of the query to generate a set of QEPs, wherein the properties of each QEP in the set of QEPs satisfies the requirements of the query;

supplementing the QEPs in the set of QEPs with additional QEPs that access at least one of the ASTs and have properties that overlap the requirements of the query; and pruning the QEPs in the set.

30. The apparatus of claim 29, wherein the logic for supplementing comprises logic for:

determining a set of processing requirements for an AST;

invoking an access rule for AST with the processing requirements of the AST to obtain the additional QEPs that access the ASTs; and supplementing the QEPs in the set of QEPs with the additional QEPs.

31. The apparatus of claim 30, wherein the logic for determining comprises logic for:

reducing the requirements of the query by removing components of each requirement already satisfied by a corresponding property of the AST;

determining whether each of the reduced requirements of the query overlaps with the corresponding property of the AST; and mapping each of the reduced requirements of the query to the processing requirements of the AST by substituting table and column references in the reduced requirement with corresponding table and column references of the AST using matching information encapsulated as a property of the AST.

32. The apparatus of claim 31, wherein the logic for reducing comprises logic for iteratively reducing the requirements of the query until no further reduction is possible.

33. The apparatus of claim 30, wherein the logic for invoking comprises logic for computing properties of at least one QEP operator representing an access path of the AST.

34. The apparatus of claim 33, wherein the logic for computing comprises logic for:

initializing each property of the operator with the corresponding property of the AST;

mapping each of the processing requirements of the AST to the requirements of the query by substituting table and column references in the processing requirements of the AST with corresponding table and column references of the query as described in matching information encapsulated as a property of the AST; and invoking a property function for the operator with the initialized properties of the operator and the processing requirements of the AST.

35. An article of manufacture embodying logic for performing method steps for optimizing a query, the query being performed by a computer system to retrieve data from a database stored in a data storage device coupled to the computer system, the method comprising:

(a) identifying one or more automatic summary tables (ASTs) that the query by matching definitions of the ASTs with requirements of the query, wherein the requirements of the query satisfied by an AST are encapsulated as a set of properties;

(b) enumerating one or more alternative query execution plans (QEPS) for the query, including at least one QEP that represents one or more access of the identified ASTs;

(c) assigning a cost to each of the alternative QEPs; and (d) choosing a most efficient one of the alternative QEPs based upon the assigned costs.

36. The method of claim 35, wherein the identifying step comprises comparing the requirements of the query and the definitions of at least one of the ASTs to determine whether the AST and the query overlap.

37. The method of claim 36, wherein the comparing step comprises determining requirements of the query satisfied by the AST and characterizing the requirements as properties.

38. The method of claim 37, wherein the properties are selected from a group comprising tables referenced, columns supplied, expressions computed, predicates applied, unique keys and functional dependencies in effect, aggregation performed, and column mapping information.

39. The method of claim 35, wherein the enumerating step comprises using dynamic programming to exhaustively enumerate the alternative QEPs, thereby obtaining an optimal result for the query.

40. The method of claim 35, wherein the enumerating step comprises:
invoking at least one optimization rule R with requirements $R_1, \ldots, R_M$ to generate a set of QEPs, RQ, wherein the properties of each QEP in RQ satisfies the requirements $R_1, \ldots, R_M$;
supplementing the QEPs in RQ with QEPs that access at least one of the ASTs and have properties $A.P_1, \ldots, A.P_M$ that overlap the requirements $R_1, \ldots, R_M$; and
pruning the QEPs in RQ using a multi-dimensional pruning metric.

41. The method of claim 40, wherein the supplementing step comprises:
determining a set of processing requirements $AR_1, \ldots, AR_M$ for an AST;
invoking an access rule for the AST with the processing requirements $AR_1, \ldots, AR_M$ to obtain a set of QEPs, QA, for accessing the AST; and
adding the set of QEPs, QA, to the set of QEPs, RQ.

42. The method of claim 41, wherein the determining step comprises:
reducing the requirements $R_1, \ldots, R_M$ to requirements $RR_1, \ldots, RR_M$ by removing components of each requirement $R_i$ already satisfied by a corresponding property $A.P_i$ of the AST;
determining whether each of the reduced requirements $RR_i$ overlaps with the corresponding property $A.P_i$ of the AST; and
mapping each of the reduced requirements $RR_1, \ldots, RR_M$ to processing requirements $AR_1, \ldots, AR_M$ of the AST by substituting table and column references in $RR_1$ with corresponding table and column reference of the AST using matching information QA encapsulated as a property of the AST.

43. The method of claim 42, wherein the reducing step comprises iteratively reducing the requirements $R_1, \ldots, R_M$ to reduced requirements $RR_1, \ldots, RR_M$ until no further reduction is possible.

44. The method of claim 41, wherein the invoking step comprises computing properties of at least one QEP operator O representing an access to the AST.

45. The method of claim 44, wherein the computing step comprises:
initializing each property $O.P_i$ of the operator O with the corresponding property $A.P_i$ of the AST;
mapping each of the processing requirements $AR_1, \ldots, AR_M$ to query requirements $R_1, \ldots, R_M$ by substituting table and column references in $AR_i$ with corresponding table and column reference of the query as described in the matching information QA encapsulated as a property of the AST; and invoking a property function for the operator O with the initialized properties $O.P_1, \ldots, O.P_N$ and the processing requirements $R_1, \ldots, R_M$.

46. The method of claim 35, wherein the enumerating step comprises:
invoking at least one optimization rule with the requirements of the query to generate a set of QEPs, wherein the properties of each QEP in the set of QEPs in the set of QEPs satisfies the requirements of the query;
supplementing the QEPs in the set of QEPs with additional QEPs that access at least one of the ASTs and have properties that overlap the requirements of the query; and
pruning the QEPs in the set.

47. The method of claim 46, wherein the supplementing step comprises:
determining a set of processing requirements of an AST;
invoking an access rule for the AST with the processing requirements of the AST to obtain the additional QEPs that access the ASTs; and
supplementing the QEPs in the set of QEPs with the additional QEPs.

48. The method of claim 47, wherein the determining step comprises:
reducing the requirements of the query by removing components of each requirement already satisfied by a corresponding property of the AST;
determining whether each of the reduced requirements of the query overlap with the corresponding property of the AST; and
mapping each of the reduced requirements of the query to the processing requirements of the AST by substituting table and column references in the reduced requirement with corresponding table and column references of the AST using matching information encapsulated as a property of the AST.

49. The method of claim 48, wherein the reducing step comprises iteratively reducing the requirements of the query until no further reduction is possible.

50. The method of claim 47, wherein the invoking step comprises computing properties of at least one QEP operator representing an access path of AST.

51. The method of claim 50, wherein the computing step comprises:
initializing each property of the operator with the corresponding property of the AST;
mapping each of the processing requirements of the AST to the requirements of the query by substituting table and column references in the processing requirements of the AST with corresponding table and column references of the query as described in matching information encapsulated as a property of the AST; and
invoking a property function for the operator with the initialized properties of the operator and the processing requirements of the AST.

52. The method of claim 35, wherein the enumerating step comprises:
invoking at least one optimization rule having requirements to generate a set of QEPs, wherein the properties of each QEP in the set of QEPs satisfies the requirements;
supplementing the QEPs in the set of QEPs with additional QEPs that access at least one of the ASTs and have properties that overlap the requirements of the optimization rules; and pruning the QEPs in the set using a multi-dimensional pruning metric.

53. The method of claim 52, wherein the supplementing step comprises:

determining a set of processing requirements for an AST;

invoking an access rule for the AST with the processing requirements of the query to obtain the additional QEPs that access the ASTs; and supplementing the QEPs in the set of QEPs with the additional QEPs.

54. The method of claim 53, wherein the determining step comprises:

reducing the requirements of the query by removing components of each requirement already satisfied by a corresponding property of the AST;

determining whether each of the reduced requirements of the query overlaps with the corresponding property of the AST; and mapping each of the reduced requirements of the query to the processing requirements of the AST by substituting table and column references in the reduced requirement with corresponding table and column reference of the AST using matching information encapsulated as a property of the AST.

55. The method of claim 54, wherein the reducing step comprises iteratively reducing the requirements of the query until no further reduction is possible.

56. The method of claim 53, wherein the invoking step comprises computing properties of at least one QEP operator representing an access to the AST.

57. The method of claim 56, wherein the computing step comprises:

initializing each property of the operator with the corresponding property of the AST;

mapping each of the processing requirements of the AST to the requirements of the query by substituting table and column references in the processing requirements of the AST with corresponding table and column references of the query as described in the matching information encapsulated as a property of the AST; and invoking a property function for the operator with the initialized properties of the operator and the processing requirements of the AST.

* * * * *